United States Patent [19]

Schoenwald et al.

[11] Patent Number: 5,485,076
[45] Date of Patent: Jan. 16, 1996

[54] HIGH EFFICIENCY AUXILIARY SWITCHING POWER SUPPLIES

[75] Inventors: David S. Schoenwald, Los Gatos; Charles O. Forge, Los Altos, both of Calif.

[73] Assignee: Apple Computer, Inc., Cupertino, Calif.

[21] Appl. No.: 291,266

[22] Filed: Aug. 16, 1994

[51] Int. Cl.$^6$ ........................... H02M 3/335
[52] U.S. Cl. ............... 323/225; 363/98; 363/132; 323/224
[58] Field of Search .................. 323/232, 233, 323/223–225, 349–351; 363/17, 20–21, 56, 97–98, 131–132

[56] References Cited

U.S. PATENT DOCUMENTS

| | | | |
|---|---|---|---|
| 3,129,381 | 2/1960 | Manteuffel | 323/89 |
| 4,745,538 | 5/1988 | Cross et al. | 363/21 |
| 5,331,533 | 7/1994 | Smith | 363/20 |

*Primary Examiner*—Peter S. Wong
*Assistant Examiner*—Aditya Krishnan
*Attorney, Agent, or Firm*—Apple Computer, Inc.

[57] ABSTRACT

Method and apparatus for producing an auxiliary voltage in a switching power supply. One or more auxiliary windings are coupled to the main inductor of the switching power supply. A synchronous switch is used in conjunction with the auxiliary winding to provide rectification and additionally provides waveform averaging which improves efficiency and voltage regulation over varying load conditions.

6 Claims, 2 Drawing Sheets

HIGH EFFICIENCY AUXILIARY SWITCHING POWER SUPPLIES

BACKGROUND OF THE INVENTION

The present invention pertains to high efficiency switching power supplies, particularly to providing an auxiliary voltage on a switching power supply.

Switching power supplies are widely used in electronic devices. They convert unregulated power from batteries or other sources to a regulated voltage required to operate the device. Especially with hand held and portable devices, high efficiency is required to achieve long battery life. These switching supplies provide a primary voltage, usually 3.3 or 5 volts D.C. to operate digital logic in the device. It is also common to require one or more auxiliary voltages in the operation of the device, such as for modems, serial ports, or for the contrast control voltage for a liquid crystal display.

It is known in the industry to derive an auxiliary voltage from a switching supply by replacing the inductor in the switching power supply with a transformer; the primary winding of the transformer replaces the inductor in the switching power supply. The secondary winding of the transformer is fed to a conventional half wave rectifier and filter capacitor to derive the auxiliary voltage. Unfortunately this scheme while low in cost exhibits poor regulation and low efficiency on the auxiliary voltage, especially over varying load current. Past solutions to the problem of poor regulation on the auxiliary voltage include adding a series regulator, or adding a fixed load on the auxiliary voltage, a type of shunt regulation. Both these solutions decrease the efficiency of the power supply, decrease battery life, and add to component count and therefore cost of the overall device.

What is needed is a method of providing an auxiliary voltage from a switching power supply that is efficient and provides tight regulation of the auxiliary voltage.

SUMMARY OF THE INVENTION

An efficient, tightly regulated auxiliary voltage is provided in a switching power supply by using a synchronous switch which provides high efficiency and good regulation on auxiliary outputs. One or more auxiliary windings are coupled to the main inductor of the switching power supply. A synchronous switch is used in conjunction with the auxiliary winding to provide rectification and additionally provides waveform averaging which improves voltage regulation over varying load current.

Other objects, features, and advantages of the present invention will become more fully apparent from the following detailed description of the preferred embodiment, the appended claims, and the accompanying drawings.

DETAILED DESCRIPTION OF THE INVENTION

Figure 1:
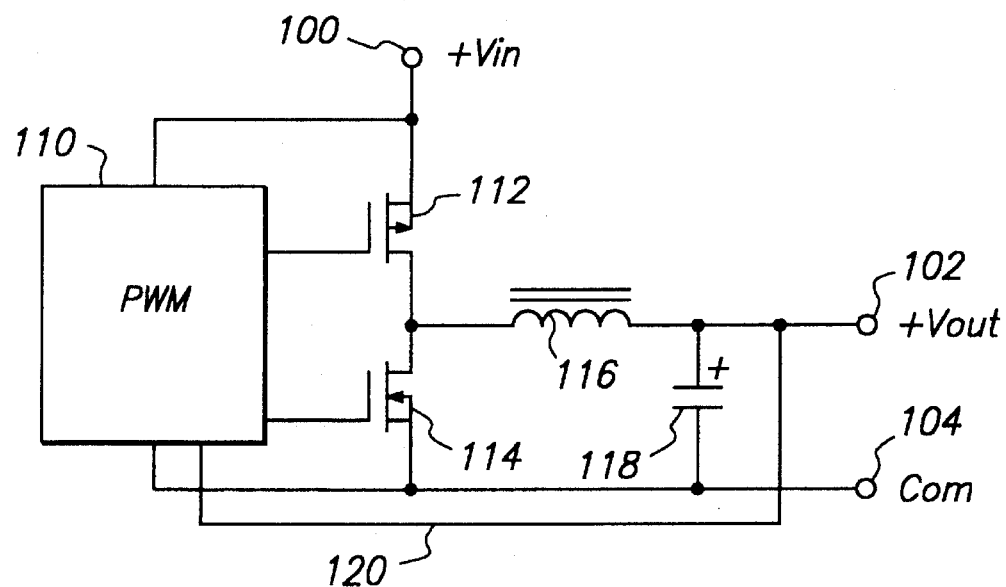
FIG. 1 is the schematic diagram of a switching power supply.

FIG. 1 is the schematic of a conventional switching power supply in the buck configuration. A positive supply voltage higher than the desired output voltage is provided to +Vin terminal 100. Regulated +Vout voltage is provided at terminal 102. The Common supply terminal is 104. Pulse width modulator (PWM) 110, such as the LT1148 manufactured by Linear Technology, provides non overlapping drive signals to the gates of P-channel switch 112 and N-channel switch 114. In modern high frequency, high efficiency switching power supplies these are typically power MOSfets, such as the Siliconix Si9952, which provides both a P-channel and an N-channel switch in one package. Switches 112 and 114 feed inductor 116. By switching the junction of switches 112 and 114 and inductor 116 between +Vin and common, a square wave with average voltage +Vout is generated. The output of inductor 116 is filtered by capacitor 118 to provide a filtered, regulated output at +Vout terminal 102. Typical values for inductor 116 and capacitor 111 are 30 micro henries and 100 micro farads, respectively. PWM 110 senses the output voltage via control line 120, and produces non-overlapping gate drive signals to switches 112 and 114, adjusting the pulse widths to maintain a constant output voltage as is known in the art.

Figure 2:
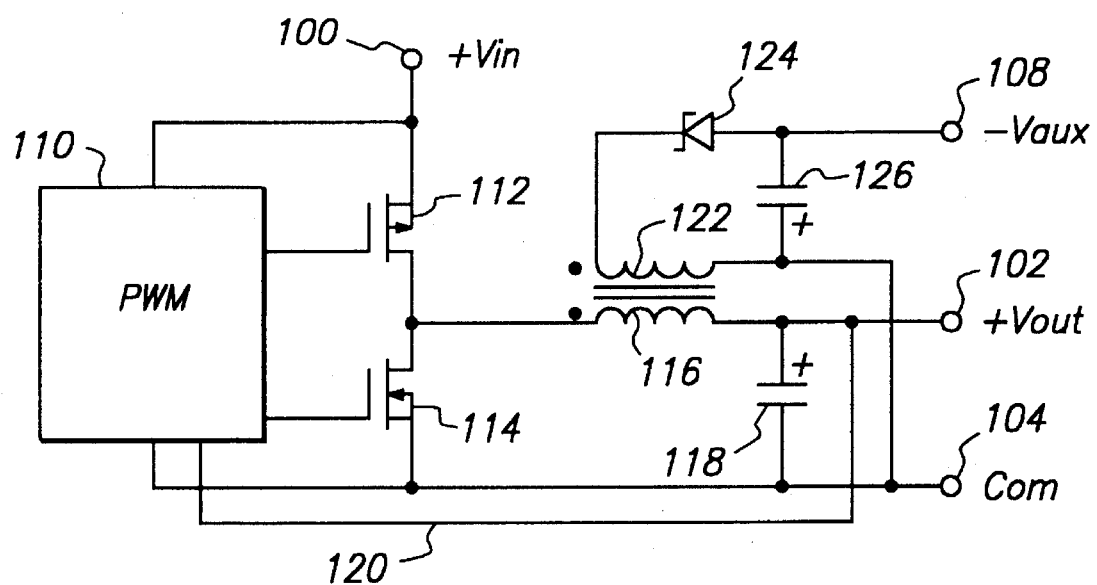
FIG. 2 is the schematic of a switching power supply with auxiliary output.

FIG. 2 is the schematic of a conventional switching power supply to which an auxiliary output has been added. Inductor 116 has added to it secondary winding 122, the dots showing the phasing of the windings. Secondary winding 122 feeds rectifier diode 124 and filter capacitor 126 to provide auxiliary voltage −Vaux at terminal 108. Diode 124 is typically a Schottky barrier rectifier such as the 1N5817.

Ideally, if inductor windings 116 and 122 of FIG. 2 had a turns ratio of 1 to 1, the auxiliary voltage −Vaux 108 would be approximately the negative of main supply voltage +Vout 102. Different auxiliary voltages are possible by altering the turns ratio of windings 116 and 122. In the ideal situation, ignoring the load dependant voltage drop across diode 124, the relationship between the main supply voltage +Vout 102 and the auxiliary supply voltage −Vaux 108 is set by the turns ratio of windings 116 and 122, and the regulation of auxiliary supply voltage −Vaux 108 is the same as the regulation of main supply voltage +Vout 102.

In reality, leakage inductance and inter winding capacitance between windings 116 and 122 generates ringing present on winding 122. Diode 124 and capacitor 126 effectively form a peak detector, especially at low load currents. Diode 124 only conducts in one direction so filter capacitor 126 is charged to the peaks of the ringing introduced by leakage inductance and capacitance. This ringing and peak detection produce an output voltage that rises as load current decreases. At low load currents, the output voltage can increase by up to 50%. The output voltage −Vaux 108 therefore changes with the load current on the auxiliary supply, independent of the regulation of main supply voltage +Vout 102.

Additionally, the impedance of diode 124 is not equal to the impedance of switch 114. The impedance of diode 124 also changes with the load current. This leads to additional changes in output voltage −Vaux 108 of the auxiliary supply with respect to load current.

Previous solutions to the regulation problems on the auxiliary supply include placing a load in the form of a resistor across the auxiliary output as a type of shunt regulator, or adding a secondary series regulator to the secondary output. Placing a load resistor across the auxiliary output as a shunt to stabilize it by providing a minimum load wastes power, and decreases efficiency. Adding a secondary series pass regulator to the auxiliary output requires that the minimum voltage drop across the series regulator be met. This means that the turns ratio of windings 116 and 122 must be changed to provide a higher voltage across winding 122 to compensate for the voltage drop across the series regulator. The total voltage drop across the series regulator is wasted energy, decreasing efficiency. Also, more components are needed for the series regulator, adding to the circuit complexity, parts count, size, and cost.

Figure 3:
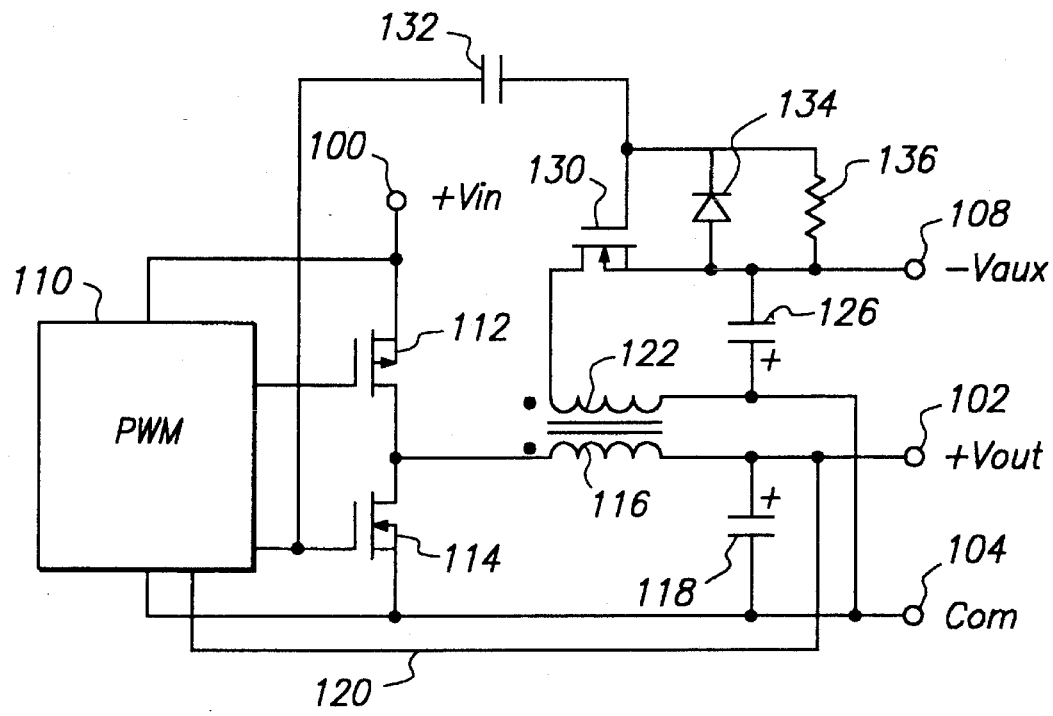
FIG. 3 is the schematic of a switching power supply with the auxiliary output according to a first embodiment of the present invention.

FIG. 3 shows a switching power supply with an auxiliary output according to the present invention. Rectifier 124 of FIG. 2 has been replaced by synchronous N-channel switch 130 in FIG. 3. Gate drive for switch 130 is provided through coupling capacitor 132 from the gate of N-channel switch 114 Diode 134 and resistor 136 provide DC restoration for the capacitively coupled gate drive signal.

In the negative auxiliary output design shown in FIG. 3, switch 130 is driven synchronously with switch 114 through coupling capacitor 132 and DC restoration network composed of clamp diode 134 and capacitor 136. The ringing signal generated by leakage inductance and capacitance between windings 116 and 122 described previously is still present. But, switch 130 when turned on conducts in both directions, averaging the ringing voltage to the output voltage stored in filter capacitor 126, and rapidly damping the ringing. This drastically reduce the effects of ringing, producing an auxiliary output voltage −Vaux 108 that remains constant over a wide current range.

Additionally, the impedance of switch 130 is the same as the impedance of switch 114 The impedance of switches 114 and 130 in the on state is approximately 100 to 200 milli Ohms, for a typical FET such as the SI9952, and does not vary appreciably across the range of load currents. Thus the regulation of auxiliary output voltage −Vaux 108 closely tracks that of main supply voltage +Vout 102. Efficiency is also increased due to the lower voltage drop across switch 130.

Thus, the introduction of a synchronous switch in the auxiliary supply circuit results in high efficiency and tight voltage regulation over a wide load current range.

Figure 4:
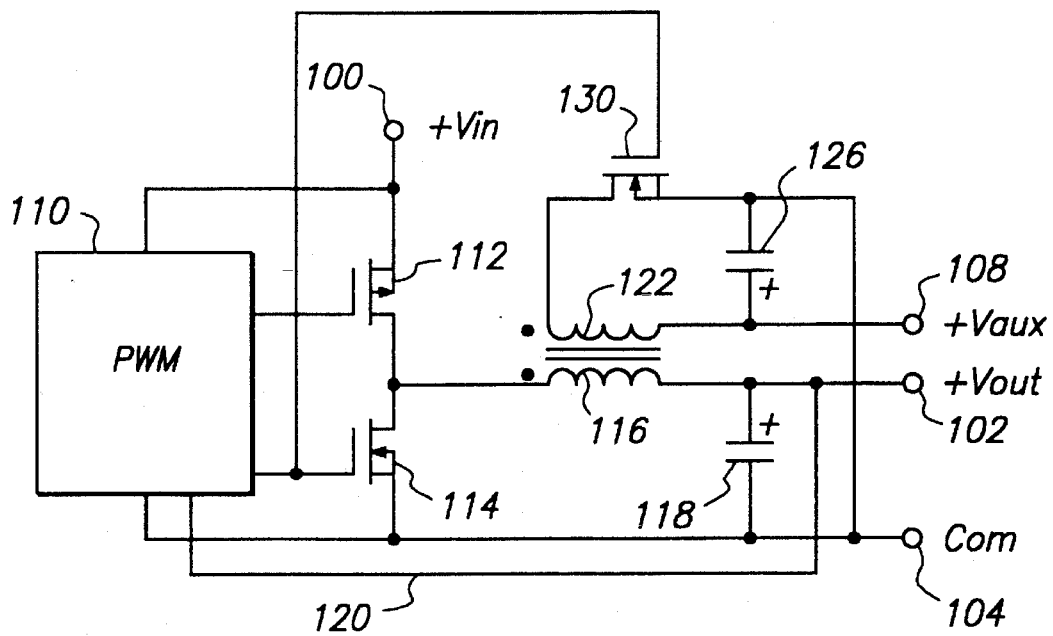
FIG. 4 is the schematic of a switching power supply with the auxiliary output according to a second embodiment of the present invention.

A second embodiment of the invention is shown in FIG. 4, demonstrating a positive auxiliary voltage, and direct coupling of the gate of synchronous switch 130 in the auxiliary supply to the gate of N channel switch 114. In this embodiment coupling capacitor 132 of FIG. 3, and DC clamp components 134 and 136 are not needed.

Multiple auxiliary outputs can also be provided by adding additional auxiliary windings, synchronous switches, and gate drive coupling.

For an alternate embodiment producing a positive auxiliary output voltage, the phasing of the secondary winding could be reversed, and a P-channel switch used for synchronous switch 130 instead of the N-channel switch shown in FIG. 3, and the gate drive signal inverted.

Other drive coupling approaches will also be apparent to those skilled in the art. A transformer could be used to couple the drive signal to the gate of switch 130. An optoisolator could also be used. Use of transformer or optoisolator coupling would be advantageous in designs where an isolated auxiliary voltage is needed. Transformer coupling also provides an easy means for inverting the drive signal by use of the phasing of the transformer windings.

While the invention has been described with reference to specific embodiments, it will be understood by those skilled in the art that various changes may be made, and equivalents substituted for elements thereof, without departing from the true spirit and scope of the invention. In addition, many modifications may be made without departing from the essential techniques of this invention as defined by the following claims.

What is claimed is:

1. In a switching power supply for producing a first output having a controlling circuit controlling a first switch connected to a first end of a first transformer winding, and the first output connected to the second end of the first transformer winding, a secondary output comprising:

a second transformer winding inductively coupled to the first transformer winding, a second switch connected to the second transformer winding, drive coupling connected from the controlling circuit to the second switch for switching the second switch in synchrony with the first switch, and a filter capacitor connected across the second switch and the second transformer winding for filtering; the secondary output.

2. The switching power supply of claim 1 where the drive coupling comprises direct DC coupling of the second switch to the controlling circuit.

3. The switching power supply of claim 1 where the drive coupling comprises AC coupling of the second switch to the controlling circuit.

4. The switching power supply of claim 1 where the second switch is a field effect transistor.

5. The switching power supply of claim 3 where the AC coupling comprises a capacitor.

6. The switching power supply of claim 3 where the AC coupling comprises a transformer.

* * * * *